United States Patent
Vedamuttu

[19]

[11] Patent Number: 6,165,391

[45] Date of Patent: Dec. 26, 2000

[54] MANUFACTURE OF OPTICAL DATA STORAGE DISC

[75] Inventor: Paul Vedamuttu, Gwent, United Kingdom

[73] Assignee: Nimbus Manufacturing (UK) Limited, Gwent, United Kingdom

[21] Appl. No.: 09/117,106

[22] PCT Filed: Jan. 23, 1997

[86] PCT No.: PCT/GB97/00204

§ 371 Date: Mar. 1, 1999

§ 102(e) Date: Mar. 1, 1999

[87] PCT Pub. No.: WO97/27584

PCT Pub. Date: Jul. 31, 1997

[30] Foreign Application Priority Data

Jan. 23, 1996 [GB] United Kingdom ................. 96012893

[51] Int. Cl.⁷ ................................................. B29D 11/00

[52] U.S. Cl. .......................... 264/1.33; 264/404; 264/107; 264/293; 425/385; 425/411; 425/812; 425/810

[58] Field of Search .................................. 264/1.33, 106, 264/107, 404, 293; 425/810, 385, 406, 408, 411, 420, 812

[56] References Cited

U.S. PATENT DOCUMENTS

| | | | |
|---|---|---|---|
| 4,231,730 | 11/1980 | Birt | 425/810 |
| 4,243,367 | 1/1981 | Renoux | 425/810 |
| 4,288,481 | 9/1981 | Birt et al. | 264/107 |
| 4,409,169 | 10/1983 | Bartholdsten et al. | |
| 4,496,300 | 1/1985 | Strausfeld | 425/810 |
| 5,242,630 | 9/1993 | Nuij et al. | 264/1.33 |
| 5,427,599 | 6/1995 | Greschner et al. | |
| 5,458,818 | 10/1995 | Kim et al. | 425/810 |

*Primary Examiner*—Mathieu D. Vargot
*Attorney, Agent, or Firm*—Marshall, O'Toole, Gerstein, Murray & Borun

[57] ABSTRACT

A method and apparatus forming a micro-relief pattern on a surface of an optical disc, which micro-relief pattern may form a holographic image in which a shim bearing a micro-relief pattern is pressed onto the surface of the disc and the apparatus used ensures that a greater force is applied to the periphery of the disc and the remainder of the surface on which it is desired to form the micro-relief pattern, such method and apparatus enables a satisfactory relief pattern to be formed over a substantial area of the surface of the disc.

17 Claims, 2 Drawing Sheets

MANUFACTURE OF OPTICAL DATA STORAGE DISC

BACKGROUND OF THE INVENTION

The present invention relates to a method of manufacture of an optical data storage disc in which there is at least one layer of information and a further layer, spaced from said first layer or layers, which may also be an information layer or be provided with some other micro-relief pattern, as examples a micro-relief pattern to present a holographic image, other optically variable devices and digital information (pits and lands).

Optical data storage discs have been known for some time, one example being known commercially as a compact disc, such a disc usually comprising a layer of plastics material, on one side of which is formed a micro-relief pattern in the form of indentations which comprise an encoded signal. The side of the disc provided with the micro-relief pattern is then metallised to provide a reflective layer and coated with a lacquer to protect the metallised layer. The information layer is then read by a laser through the plastics layer.

Another application for this invention is a form of optical disc known as DVD which can have more than one information layer. A DVD disc has several formats but always comprises two substrates each formed with at least one information layer. The two substrates are then secured to each other.

The side of the disc covered with lacquer is often provided with printed information indicating the contents of the disc, e.g. the name of the orchestra or singer as the case may be. It is also known to provide some artistic design.

European Patent EP 0608358B1 describes an optical data storage disc in which a micro-relief pattern is embossed in the lacquer forming the protective layer for the metallised surface, the micro-relief pattern defining a holographic image.

Compact discs are normally formed from polycarbonate material which is injected into an injection moulding machine in which a stamper is present, the stamper forming the pattern of indentations in the subsequently formed disc to provide the encoded signal. Other techniques use a compression moulding technique. In both cases the substrate formed has the majority of both surfaces flat, for example within 2 microns.

As aforementioned, the majority of both the surfaces of the substrate are flat, however, the manner in which the disc is formed leads to an increase in substrate thickness hereafter referred to as a peripheral ridge. The precise dimension of the peripheral ridge varies slightly, depending upon the mould used. However, typically, the ridge may commence approximately 5 mm from the periphery of the substrate, the height of the ridge gradually increasing towards the periphery to an amount typically 50 microns above the average substrate thickness elsewhere.

Such a ramp-like ridge may be formed by both sides of the substrate.

The extension above the otherwise flat surface of the polycarbonate substrate is therefore out of all proportion compared to the general surface flatness of 1 or 2 microns and the height of this peripheral ridge is further accentuated when the surface of the disc is covered with a layer of protective lacquer which can be in a wide range of thickness (1 to 100 um).

In practical optical disc production, the lacquer layer may typically be in the region of 4–12 microns thick over the majority of the surface. However, the thickness of the lacquer may be 2 or 3 times greater in the region of the peripheral ridge. The height of the peripheral ridge above the lacquered surface of the disc is therefore considerable.

It has been found that if one attempts to emboss a holographic micro-relief pattern in the protective lacquer, the presence of the peripheral ridge prevents a proper embossing of the disc and at best, leaves a patchy holographic image.

It is an object of the present invention to provide a method of providing a micro-relief pattern on an optical data storage disc.

SUMMARY OF THE INVENTION

According to one aspect of the present invention, we provide a method of providing a micro-relief pattern on an optical data storage disc comprising the steps of providing an embossing member adapted to form the required micro-relief pattern on the optical data storage disc. supporting said disc on a support member, applying a force to bring said embossing member and said disc into contact with each other to the extent where the micro-relief pattern from the embossing member is transferred to the disc and wherein the force is applied in a manner, or said disc is supported by said support member in a manner, to at least initially, increase the pressure to which the disc is subjected in the region of said peripheral ridge compared with the remainder of the disc.

Preferably, said increase in pressure is achieved by providing a support member having at least one surface which is concave.

Alternatively, a surface associated with a means for applying the force may be provided with a concave surface to provide said increase of pressure in the region of said peripheral ridge.

Alternatively, the support member or a surface associated with the means for applying force to the disc may be of a non-uniform nature, such that a region of said surface and/or said support member adjacent to the peripheral ridge during an embossing operation presents a hardness greater than the remainder of said surface and/or said support member.

Preferably, the support member has an upper surface on which the disc is supported which is concave, the support member itself being supported by a secondary support member. A hydraulic ram may be used to apply sufficient pressure for the embossing of the disc.

Preferably, the support member has an upper surface on which the disc is supported, which is concave and a lower surface which is convex. The radius of curvature of the concave surface and the convex surface are different from each other, such that the periphery of the support member is thicker.

As an alternative, both surfaces of the support member may be concave.

In the case where the support member is made from PERSPEX (RTM) and has one concave surface and one convex surface, it is envisaged that the difference between the thickness of the centre of the support member and the periphery, may be between 5 and 100 microns. Whereas it is necessary to have sufficient difference in order to compress the ridge-like circumference of the disc, it is also preferable to have the minimum thickness difference necessary, since this will reduce the pressure necessary, to compress the ramp to form the holographic image.

Preferably, the pressure applied by the ram is maintained as low as possible to form a satisfactory image, since:

(a) this reduces the production time;
(b) reduction in pressure applied by the ram will decrease the possibility of particles adversely affecting the information layer or layers in the optical disc.

Preferably, said support member is of a material having some compressibility and may be a plastics material. Conveniently, said support member comprises PERSPEX (RTM) (polymethyl methaciylate, or PUMA) and has a thickness between 5 mm and 20 mm.

It is envisaged that if the support member is made from a material other than PERSPEX (RTM), the distance between the centre of each face and the plane of the respective periphery of the support member may be different from the range found satisfactory for PERSPEX (RTM).

As an alternative to a concave surface on the support member, the support member may be of non-uniform nature so that the region that will support the peripheral edge of the disc has a hardness greater than the remainder of the support member.

Such a support member could be achieved by having a homogenous support member mechanically or chemically altered so that the region that will support the peripheral region of the disc is harder than the remainder, for example the support member other than in the peripheral region may have holes or other deformities in its surface or may be treated in some way such that the peripheral region is harder than the remainder.

It is further envisaged that the support member may be of non-homogenous construction, the periphery being of a harder material than the remainder. It is further envisaged that the support member may be constructed and/or treated such that a variable hardness is presented, the hardest part being in the region that will support the periphery of the disc.

The concave surface however has been found to produce exceptional results and produces a micro-relief pattern over the entire embossed surface and with hindsight, it is believed that the concave surface works because it produces a far from even force per unit area on the disc.

It is also believed that the success achieved by a support member with a concave surface may be because it facilitates an even extraction of air between the optical disc and the embossing surface and minimises the possibility of air pockets remaining. These air pockets would adversely affect the quality of the image formed on the disc.

The force applied may depend on the size of the ridge formed depending upon the particular moulding process. However, the force applied is quite considerable and in some instances, a force of about 27 tonnes force is used.

Initially the force is applied to the periphery of the disc and the ridge formed thereon by the polycarbonate, and the lacquer is effectively squashed or deformed primarily within elastic limits such that after the disc is so deformed to present a substantially flat surface to the embossing member, the peripheral ridge will, albeit in a slightly smaller form, be once again present on the embossed disc.

It is believed that the force applied to the periphery of the disc partly squashes the ridge and partly deforms the support member so that the disc is deformed in the region of the ridge and is at least partially absorbed, elastically, by the support member. It will be appreciated that the support member, at least when made from PERSPEX (RTM), even though a harder material than the polycarbonate from which the disc is made, is thicker than the disc and hence is subject to greater deformation thereby partially absorbing the periphery of the disc on which the ridge is formed.

It is a further object of the invention to provide apparatus for embossing a micro-relief pattern on the surface of an optical data storage disc.

According to a further aspect of the present invention, we provide apparatus for embossing a micro-relief pattern in an optical data storage disc, said apparatus comprising an embossing member adapted to provide the required micro-relief pattern on the disc, means for supporting said disc and means for applying a force between said embossing member and said disc support member in a direction towards each other, wherein said means for applying said force or said disc support member at least initially subjects the periphery of the disc to a greater pressure than the remainder of the disc.

Preferably, said greater pressure is enabled by providing the disc support member with a concave disc-supporting surface.

Preferably, said apparatus comprises means for heating the embossing member. Conveniently, a further support member is provided to support the disc support member. Conveniently said disc support member has an upper disc concave support surface and a lower convex surface, the radius of curvature of the concave side being smaller than the convex side, thus resulting in a support member which is thicker at the periphery than at the centre.

The disc support member may comprise a plastics material. Conveniently, the disc support member is made form PERSPEX (RTM). When the support member is made from PERSPEX (RTM) it has been found that the concavity of one or if desired, both surfaces of the disc support member is such that the centre of the support member is spaced by 5–100 microns from the plane of the respective periphery of the support member.

The amount of concavity may depend on the height of the ridge of the disc above the remainder of the surface and on the force to be applied during embossing of the disc.

As an alternative, the support member may present a hardness in the region of the periphery of the disc greater than the remainder of the support member, such a differential being achieved by a mechanical working of the support member or chemical treatment of the support member, or by providing a non-homogenous disc-support member comprising two or more different materials.

It is further envisaged that the increase in pressure applied to the periphery of the disc may be achieved by means for applying a difference in the force between the embossing member and said disc support member so that a greater force is applied to the periphery of the disc than to the remainder of the disc where the hologram is to be formed.

Preferably, the means for applying the force between the disc support member and the embossing member comprises a hydraulic ram.

Preferably, the embossing member comprises a metal shim in which a micro-relief pattern has been formed. Conveniently the shim is made from nickel.

Whereas the invention has been described, primarily in relation to the formation of a micro-relief pattern for forming a holographic image on the surface of the disc, it is also envisaged that the method and apparatus described above is equally applicable for forming a second information layer on the disc, in which case, the metallic layer already applied to the disc could be of a form capable both of reflecting light and transmitting light and the second information layer after embossing could be provided with a metallised surface which could subsequently be protected by a lacquer layer.

It is envisaged that both the method and the apparatus of the present invention may be used in the formation of information layers in multi-layer or DVD discs.

It will be appreciated that this second lacquer layer could itself be embossed in manner as described above to provide a holographic image.

It will also be appreciated that the holographic image does not only provide an aesthetically pleasing effect, but also provides additional security in that any counterfeit disc will also have to be formed with the holographic image and if not perfectly formed, will be readily identifiable as a counterfeit.

BRIEF DESCRIPTION OF THE DRAWINGS

The present invention will now be described in more detail by way of example only, with reference to the accompanying drawings wherein.

DETAILED DESCRIPTION

Figure 1:
FIG. 1 is a section through an optical disc such as a compact disc.

Referring now to FIG. 1, an optical disc is shown which comprises a plastics substrate 10 normally formed from polycarbonate, the upper surface 11 having a pattern of pits formed therein which define a data recording. The pitted surface 11 is provided with a metallic film 12 so as to provide a light reflecting surface, the metallic layer 12 being covered by a protective layer of lacquer 13 which may be an ultraviolet light curable resin such as that sold under the trade mark RENGOLUX (RTM).

The resin is normally applied to the disc by spin coating, i.e. the resin is applied to the disc at a position slightly radially inwardly from the radially innermost extremity of the metallised surface, the disc being rotated at speed, such that the resin flows towards the circumference of the disc, and is cured by exposure to ultraviolet light.

The manner in which the polycarbonate substrate 10 is formed is normally by injection moulding. A metal plate known as a stamper having a surface formed with an information layer is placed in the cavity of an injection mould and polycarbonate material is injected into the mould.

The injection moulding process produces a polycarbonate substrate bearing the information layer and having a substantially flat surface and even thickness, with maybe a variance of a few microns with the exception of the peripheral ridge 14 in the polycarbonate substrate which may be in the region of 50 microns thicker than the average thickness of the disc elsewhere.

The extreme height of the peripheral ridge formed during injection moulding is further accentuated when the disc is subsequently covered with a protective lacquer layer 13, such as that sold under the trade mark RENGOLUX (RTM), since the spin coating technique used, causes a further build-up of lacquer in the region of said peripheral ridge. For example, the lacquer layer over the majority of the disc may be in the region of 5–8 microns, whereas the height of the lacquer layer over the polycarbonate layer in the region of said peripheral ridge, may be up to twice as much.

Figure 2:
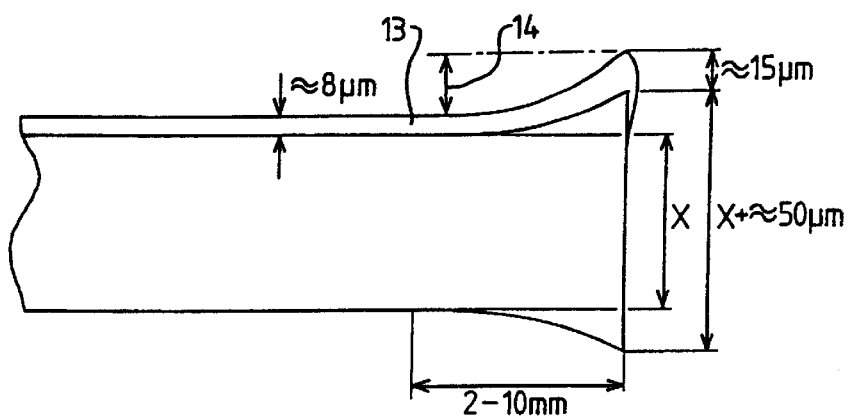
FIG. 2 is a diagrammatic view of an edge region of a compact disc.

FIG. 2 illustrates in greater detail, the very considerable extension above the average thickness of the disc, presented by said peripheral ridge.

It will thus be appreciated that the total peripheral ridge 14 of the polycarbonate and the lacquer provided on the disc presents a considerable problem when it is required to emboss the upper surface with a micro-relief pattern adapted to produce a holographic image.

The dimensions of the peripheral ridge shown in FIG. 2 are typical of one particular formation which is produced by a mould and the shape and dimensions are likely to vary with different moulds.

The embossed pattern adapted to produce interference fringes, is likely to involve the embossing of some indentation of less than 1.0 micron, thus a ramp-like ridge causes a considerable problem.

Figure 3:
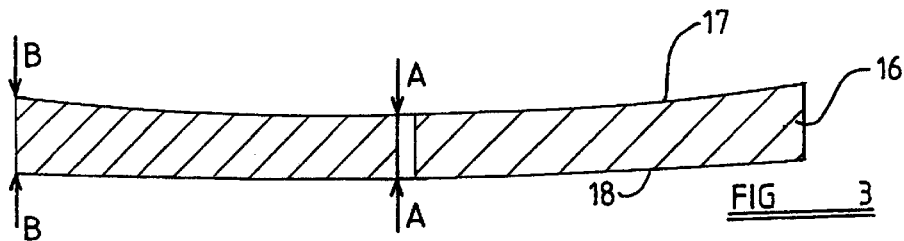
FIG. 3 shows a support member in accordance with the present invention.
Figure 4:
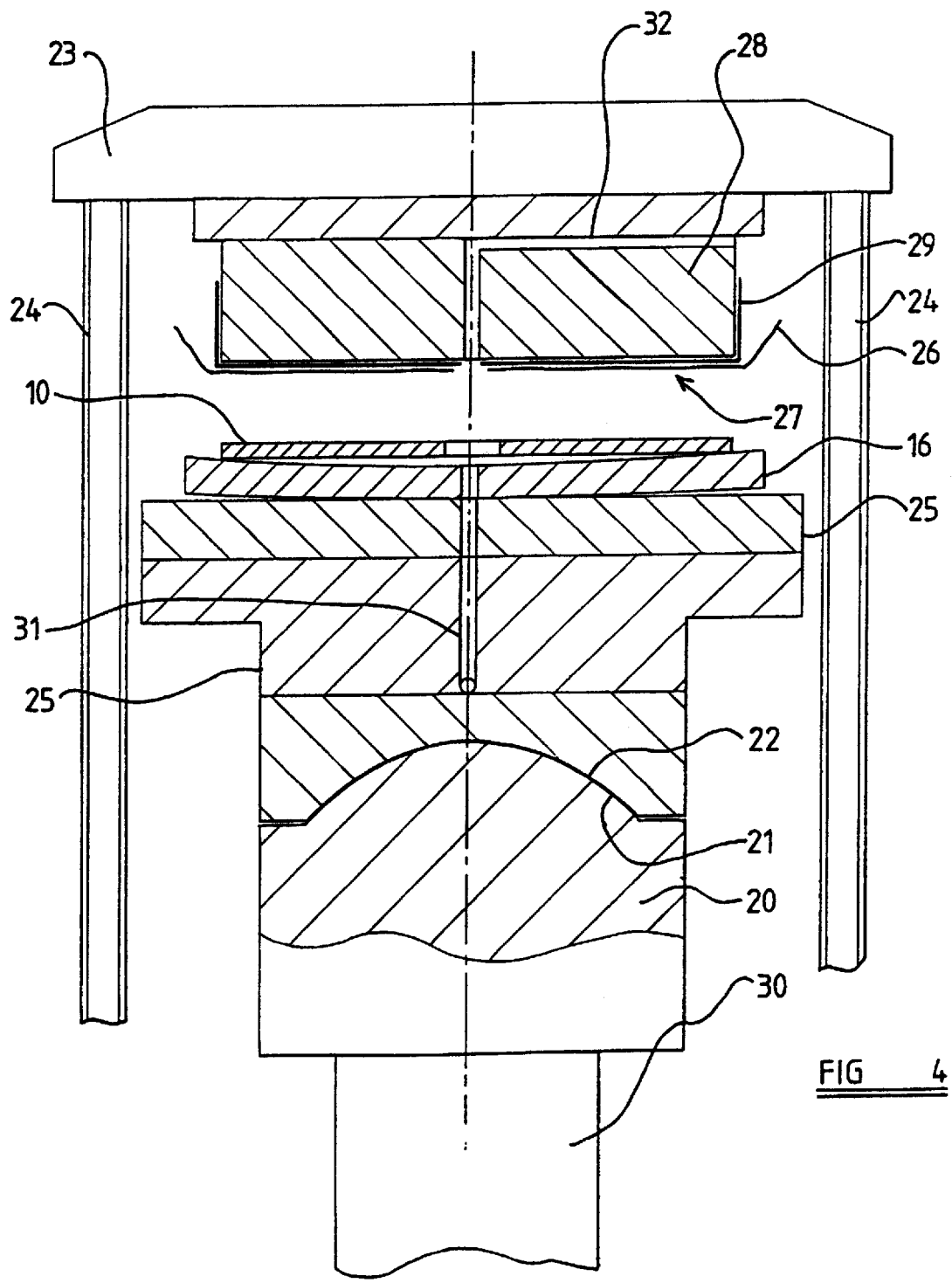
FIG. 4 shows a diagrammatic view of apparatus for embossing a disc.

Referring now to FIG. 3, a disc support member is shown, such as is used in the apparatus shown diagrammatically in FIG. 4.

The disc support member comprises a piece of PERSPEX (RTM) 16 which may be circular, square or any other convenient shape, in which the upper (disc supporting) surface 17 is concave. The lower surface is convex. However, the radii of curvature of the convex and concave surfaces are such that the support member is thicker at the periphery than at the centre. The concavity of the disc support member 16 is shown exaggerated in FIG. 3 and in practice, it has been found that the difference of dimension between A and B may be approximately 5–100 microns and preferably may be 40–80 microns. The disc support member 16 has an overall dimension such that it is at least as large as the part of the surface area of the disc to which the holographic image is to be applied.

The support member 16 itself is made from a material that can be compressed, albeit when subjected to a relatively high force, and a plastics material such as PERSPEX (RTM) has been found to be suitable.

A PERSPEX (RTM) disc support member having a thickness of between 12 and 15 mm has been found to be satisfactory. It will be appreciated that depending on the material of the disc support and its compressibility, the ideal thickness of the disc may also vary.

Referring now to FIG. 4, a diagrammatic apparatus is shown for the embossing of a holographic pattern on the lacquered surface of an optical disc and the apparatus comprises a fairly substantial support block 20 provided with an upper spherical surface 21 which cooperates with a spherical surface 22 of a support table 23. The support block 20 is mounted on a hydraulic ram 30. The support table 23 is provided with a piece of hard material, for example a piece of tool steel 25 which must have its surface supporting the disc support member 16 ground flat. The tool steel 25 supports the disc support member 16, the shape of which has been described in detail with reference to FIG. 3.

The optical disc to be embossed is placed on top of the disc support member 16.

A pattern to produce the holographic image or any other desired microrelief pattern is present on a nickel shim 26, the pattern being in the area shown by arrow 27, the nickel shim 26 being electrically isolated from an anvil 28 by a film of insulating material 29 such as KAPTON (RTM) polyamide film.

The quality of this insulating material is critical since in order for the anvil to act properly on the embossing shim 26, it is necessary for the insulating material 29 to be thin and relatively flat.

The reason for the insulating material 29 is to electrically insulate the nickel embossing shim 26 from the anvil 28, since the shim 26 is heated in order to raise the temperature of the lacquered layer 13 to a temperature at which it may be deformed, approximately 115° C. In order to raise the temperature of the lacquer layer to the required temperature to successfully emboss the impression 27, or at least the mirror image thereof on the lacquered surface of the disc, a large current is passed through the nickel embossing shim 26. It has been found that with a six volt AC potential applied to the shim, a current of about 180 amps for a time of half a second is sufficient to raise at least the surface of the lacquered layer to the required temperature to successfully emboss the pattern.

The anvil 28 is secured to an upper member 23 which in turn is secured to the remainder of the apparatus by legs 24.

It has been found very important that the surface of the anvil 28 in a similar manner to the supporting surface of the tool steel 25 should also be ground flat and it is lapped to a "mirror" surface.

Whereas the application of about 180 amps for a time of half a second, has been found to be satisfactory, it is envisaged that different currents and voltages (both AC and DC) may be used for different lengths of time. It is further envisaged that the current may be varied during the embossing time, depending upon the lacquer used and on the nature of the holographic image to be imparted.

It will be appreciated that in view of the spaced relationship of the embossing shim from the disc, it is necessary to provide relative movement between the anvil 28 and the support table 23. The movement is preferably provided by a hydraulic ram acting on the table 23, however it is envisaged that movement of the anvil 28 may alternatively or additionally be provided. It has been found that by using the concave disc support member 16, a range of embossing pressure can be used. However in practice, a maximum embossing force of about 18000 Kg force has been found to be satisfactory.

Figure 5:
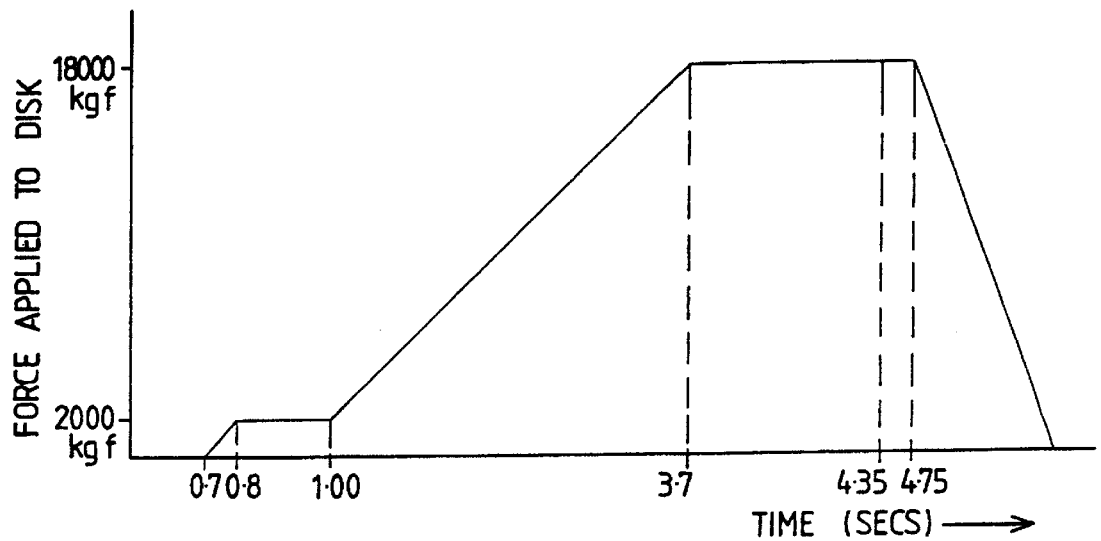
FIG. 5 is a graph showing force against time during the embossing procedure.

FIG. 5 is a graph of force against time which illustrates some of the parameters of the apparatus.

Once the disc 10 is in position on the support member 16, a 5 inch hydraulic ram 30 is activated which moves the table 25, together with a support member 16 and disc 10 towards the anvil 28.

It takes approximately 0.7 seconds for the disc 10 to come into contact with the shim 26 and then the force is increased to about 2000 Kg force and held for a further 0.2 of a second before being steadily increased up to approximately 18000 Kg force.

The initial force of about 2000 Kg force for a brief period of time is believed to be beneficial in ensuring there is complete movement of any air present between the shim and the surface of the disc 10 to be embossed so that there are no residual pockets of air which may adversely affect the formation of the holographic image.

When a force of approximately 18000 Kg force is reached, a current of about 180 amps is passed through the embossing shim 26 for approximately half a second. It is during this time that the pattern is embossed on the lacquered surface 13 of the disc 10. On disconnection of the current, the pressure is maintained for about 0.4 of a second and the ram 30 is once again activated to withdraw the disc 10. It can be seen that the entire embossing operation only has a short cycle time.

It is during the increase in pressure from contact of the disc to the final applied force of 18000 Kg force that the peripheral ridge 15 is squashed or deformed, primarily within elastic limits. The concavity of the support member 16 ensures that a very high force is applied to a very small area of the disc so that the ridge is effectively "squashed" and a substantially flat surface is presented to the embossing shim 26 prior to the current being passed through the embossing shim 26 to enable embossing to take place.

As has been aforementioned, it is also believed that the periphery of the disc where the ridge is formed is at least partly absorbed by the support member 16 which will itself be "squashed" on the application of the force.

A passageway 31 may be provided in the support member so that air cannot be trapped between the support member 16 and the table 25.

A passageway 32 is provided in the anvil 28, and the KAPTON film (RTM) 29 to provide an air escape route.

It is believed that the combination of the concave support member 16 and the manner in which the hydraulic ram 30 is operated, not only squashes the peripheral ridge on the disc 10, but also together with the air evacuation passage provided ensures that there is satisfactory evacuation of air to prevent any trapped pockets of air adversely affecting the quality of the embossed image.

Whereas the apparatus described above has been described with reference to the embossing of a micro-relief pattern adapted to produce a holographic image or other optically variable device, it will be appreciated that the method as described above and apparatus as described above may be equally applicable for the application of any other micro-relief pattern, for example an information layer defining a data recording.

The features disclosed in the foregoing description, or the following claims, or the accompanying drawings, expressed in their specific forms or in terms of a means for performing the disclosed function, or a method or process for attaining the disclosed result, as appropriate, may, separately or in any combination of such features, be utilised for realising the invention in diverse forms thereof.

What is claimed is:

1. A method of providing a micro-relief pattern on an optical data storage disc formed with a peripheral ridge extending at least around part of the periphery of said disc comprising the steps of providing an embossing member adapted to form a required micro-relief pattern on the optical data storage disc, providing a support member which is thicker at its periphery than at the center, supporting said disc on said support member, applying a force to bring said embossing member and said disc into contact with each other, the application of said force being such that a relatively small initial force is first applied to the disc for a brief period of time before subsequently increasing the force to a much greater force-value to the extent where the micro-relief pattern from the embossing member is transferred to the disc, such that the force is applied in a manner to at least initially increase the pressure to which the disc is subjected in the region of said peripheral ridge compared with the remainder of the disc.

2. A method as claimed in claim 1 characterised in that the support member has at least one surface which is concave.

3. A method as claimed in claim 2 characterised in that said support member has an upper surface upon which said disc is supported, which is concave, the support member itself being supported by a secondary support member.

4. A method as claimed in claim 2 characterised in that the support member has an upper surface upon which said disc is supported, which surface is concave and a lower surface which is convex and in that the radius of curvature of the concave surface and the convex surface are different from each other such that the periphery of the support member is thicker than the thickness of the support member radially inwardly from said periphery.

5. A method as claimed in claim 1 characterised in that the difference between the thickness of the centre of the support member and the periphery is between 5 and 100 microns.

6. A method as claimed in claim 5 characterised in that the difference between the thickness of the centre of the support member and the periphery is between 40 to 80 microns.

7. A method as claimed in claim 1 wherein the support member is made from PMMA.

8. A method as claimed in claim 7 wherein the thickness of the support member is between 5 mm and 20 mm.

9. A method as claimed in claim 1 characterized in that said relatively small initial force is up to 5000 Kg force and said greater force is up to 30,000 Kg force.

10. Apparatus for embossing a micro-relief pattern in an optical data storage disc formed with a peripheral ridge extending at least around part of the periphery of said disc, said apparatus comprising an embossing member adapted to provide the required micro-relief pattern on the disc, means for supporting said disc including a disc support member being thicker at its periphery than at the center, and means for applying a first relatively small initial force for a brief period of time before subsequently increasing the force to a force of much greater force value between said embossing member and said disc support member in a direction towards each other, wherein the shape of said disc support member at least initially subjects the peripheral ridge of the disc to a greater pressure than the remainder of the disc.

11. Apparatus as claimed in claim 10 characterised in that the disc support member is provided with a concave disc supporting surface.

12. Apparatus as claimed in claim 10 characterised in that said disc support member has an upper disc support surface which is concave and a lower surface which is convex, the radius of curvature of the concave surface being smaller than the radius of curvature of the convex surface.

13. Apparatus as claimed in claim 10, wherein said apparatus includes heating means to heat the embossing member.

14. Apparatus as claimed in claim 10, wherein the means for applying force comprises a hydraulic ram.

15. Apparatus as claimed in claim 10, wherein the embossing member comprises a nickel shim in which a relief pattern has been formed.

16. Apparatus as claimed in claim 10, wherein passages are provided in the apparatus to permit of the evacuation of any air trapped between the embossing member and said disc.

17. A method as claimed in claim 1, including the step of forming a holographic image on the surface of said optical disc.

* * * * *